(12) United States Patent
Reischmann

(10) Patent No.: US 10,578,313 B2
(45) Date of Patent: Mar. 3, 2020

(54) COLLAPSIBLE GRILL LID

(71) Applicant: Michael Reischmann, Eustis, FL (US)

(72) Inventor: Michael Reischmann, Eustis, FL (US)

(73) Assignee: Kenyon International, Inc., Clinton, CT (US)

( * ) Notice: Subject to any disclaimer, the term of this patent is extended or adjusted under 35 U.S.C. 154(b) by 0 days.

(21) Appl. No.: 15/649,112

(22) Filed: Jul. 13, 2017

(65) Prior Publication Data

US 2017/0307226 A1  Oct. 26, 2017

Related U.S. Application Data

(63) Continuation of application No. 14/326,916, filed on Jul. 9, 2014, now Pat. No. 9,726,380.

(60) Provisional application No. 61/844,682, filed on Jul. 10, 2013.

(51) Int. Cl.
| | |
|---|---|
| *F24C 15/12* | (2006.01) |
| *B23P 19/00* | (2006.01) |
| *A47J 37/07* | (2006.01) |
| *F24C 15/30* | (2006.01) |
| *A47J 37/06* | (2006.01) |
| *B63B 29/04* | (2006.01) |

(52) U.S. Cl.
CPC ............. *F24C 15/12* (2013.01); *F24C 15/30* (2013.01); *A47J 37/06* (2013.01); *B63B 29/04* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 3,692,351 A | | 9/1972 | Christopher et al. |
| 3,745,303 A | * | 7/1973 | Epperson ............... A47J 37/06 108/25 |
| 4,034,663 A | * | 7/1977 | Jenn ...................... A47J 36/38 126/21 A |
| 4,788,905 A | * | 12/1988 | Von Kohorn ....... A47J 37/0781 126/25 R |
| 5,176,067 A | * | 1/1993 | Higgins ............. A47J 37/0709 126/25 R |
| 5,195,500 A | | 3/1993 | Lerner |
| 5,233,144 A | * | 8/1993 | Morino ................ H05B 6/6494 219/730 |
| 5,411,011 A | | 5/1995 | Teta |

(Continued)

FOREIGN PATENT DOCUMENTS

DE       19810191 A1    9/1999

*Primary Examiner* — Joseph M Pelham
(74) *Attorney, Agent, or Firm* — St. Onge Steward Johnston & Reens, LLC

(57) ABSTRACT

A drop-in cooking device for installation into an opening in a fixture, including a housing configured to be mounted in the opening in the fixture, a heating element positioned in the housing and having a heating surface, wherein the heating element includes at least one of an electric heating element and an induction heating element, and a cover attachable to the housing adjacent the heating surface, the cover including a thermally insulating material and having a collapsible portion, wherein the collapsible portion of the cover has a working configuration in which the cover has a first height and a storage configuration in which the cover has a second height, the second height being less than the first height.

16 Claims, 10 Drawing Sheets

(56) References Cited

U.S. PATENT DOCUMENTS

| | | |
|---|---|---|
| 5,996,573 A | 12/1999 | Ganard et al. |
| 6,197,359 B1 | 3/2001 | Llorente Hompanera |
| 6,830,769 B2 | 12/2004 | Meroni |
| 7,282,532 B2 | 10/2007 | Akbar et al. |
| 7,284,549 B1 | 10/2007 | Eby et al. |
| 7,301,127 B1 | 11/2007 | Derridinger, Jr. |
| 7,517,933 B2 | 4/2009 | Holmes et al. |
| 7,654,402 B2 | 2/2010 | Kusuma et al. |
| 7,754,261 B2 | 7/2010 | Stewart et al. |
| D624,781 S * | 10/2010 | Allen .............................. D7/332 |
| 8,915,238 B2 | 12/2014 | Goeken |
| 9,726,380 B2 * | 8/2017 | Reischmann ........... F24C 15/12 |
| 9,958,156 B2 * | 5/2018 | Jenkins ................... F23D 14/28 |
| 2002/0148457 A1 | 10/2002 | Rice |
| 2004/0020484 A1 * | 2/2004 | Skidmore ........... A47J 37/0763 |
| | | 126/25 R |
| 2008/0164264 A1 | 7/2008 | Fung |
| 2008/0168908 A1 * | 7/2008 | Lion ....................... A47J 27/04 |
| | | 99/413 |
| 2008/0210214 A1 | 9/2008 | Wade |
| 2009/0134164 A1 | 5/2009 | Henkel |
| 2010/0031950 A1 | 2/2010 | Paslawski |
| 2010/0269711 A1 * | 10/2010 | Klein ...................... A47J 45/07 |
| | | 99/357 |
| 2011/0186561 A1 | 8/2011 | Ahmed |
| 2012/0125323 A1 | 5/2012 | Goeken |
| 2013/0043254 A1 | 2/2013 | Haworth |
| 2017/0234544 A1 * | 8/2017 | Cuffaro ................... F24B 1/205 |
| | | 126/9 R |

* cited by examiner

COLLAPSIBLE GRILL LID

FIELD OF THE INVENTION

The invention relates to cooking appliances. More specifically, the invention relates to lids for cooking appliances, such as grills.

BACKGROUND OF THE INVENTION

It is well known that use of a lid over a cooking appliance such as a grill is beneficial in numerous ways. For example, a lid over a grill serves to retain heat resulting in more evenly cooked food from the grill. Also, the lid protects the area surrounding the grill from food splatter—resulting in a cleaner cooking area. These advantages are also desired for other appliances such as griddles and ranges. For a variety of reasons, lids on cooking appliances are desirable.

In some cooking environments, however, it is not possible to install a solid lid on a cooking appliance. On boats, for example, space is extremely limited and purpose driven. This is particularly true for space above-decks outside the cabin. Outdoor kitchens installed on a boat typically include a large enclosure for covering and protecting the sink, grill, and other components of the kitchen. While the boat is under way, the enclosure is closed, but, while the boat is at anchor, the enclosure can be opened to permit use of the kitchen.

The enclosure is usually designed so that the kitchen has a low profile, which has the consequence that there is not sufficient room under the enclosure to accommodate a traditional cover for the grill. As a result, the cover is not permanently installed on the grill (such as by a hinge), but, instead, is completely detached so it can be stowed elsewhere on the boat when the enclosure is closed. This arrangement has significant disadvantages, as the cover can be lost, dislodged during use, damaged, etc.

Next, traditional cooking appliance lids are constructed using highly thermally conductive materials, such as stainless steel or other metals. These materials can become extremely hot to the touch while the appliance is in use, which can be dangerous, especially for children. These materials also do not provide good retention of cooking heat generated by the appliance, resulting in a less efficient appliance.

What is needed, therefore, is a cooking appliance cover adapted to accommodate the demands of tight spaces where a low profile is needed. A cover is needed that will provide the benefits of traditional cooking appliance covers but will be capable of assuming a low profile so that it need not be detached from the appliance. What is further needed is a cover that is safe to touch, even while the cooking appliance is in operation.

SUMMARY OF THE INVENTION

In order to overcome the deficiencies of the prior art and to achieve at least some of the objects and advantages listed, the invention comprises a drop-in cooking device for installation into an opening in a fixture, including a housing configured to be mounted in the opening in the fixture, a heating element positioned in the housing and having a heating surface, wherein the heating element comprises at least one of an electric heating element and an induction heating element, and a cover attachable to the housing adjacent the heating surface, the cover comprising a thermally insulating material and having a collapsible portion, wherein the collapsible portion of the cover has a working configuration in which the cover has a first height and a storage configuration in which the cover has a second height, the second height being less than the first height.

In some embodiments, the cover further includes a handle for opening and closing of the cover by a user.

In certain embodiments, the cover is hingedly attached to the housing.

In some cases, the collapsible portion of the cover includes silicone rubber.

In certain embodiments, the collapsible portion of the cover includes at least one weakened portion extending along a periphery of the collapsible portion, wherein the at least one weakened portion facilitates collapsing of the collapsible portion. In some of these embodiments, the at least one weakened portion includes a slit formed in a wall of said collapsible portion. In additional embodiments, the at least one weakened portion includes an area of a wall of said collapsible portion having lesser thickness than the rest of the wall.

In some embodiments, the collapsible portion of said cover has a plurality of ribs positioned on an underside of the collapsible portion, wherein said plurality of ribs provide structural support for said cover when the collapsible portion is in the working configuration.

In certain embodiments, the cover further includes a rigid frame secured to an outer periphery of the cover.

In some cases, the at least a portion of said cover includes substantially transparent material.

In certain embodiments, the drop-in cooking device is a grill.

In some embodiments, the second height of said cover is about one-quarter of the first height of said cover.

In certain embodiments, the cooking device further includes a coupling member for retaining said housing in the fixture. In some of these embodiments, the coupling member includes a ledge extending adjacent a top surface of said housing along at least two sides of said housing.

In some embodiments, the housing is non-collapsible.

A cooking device is also provided, including a non-collapsible housing, a heating element positioned in said housing and having a heating surface, and a cover attachable to said housing adjacent said heating surface, said cover comprising a thermally insulating material and having a collapsible portion, wherein the collapsible portion of the cover has a working configuration in which said cover has a first height and a storage configuration in which said cover has a second height, the second height being less than the first height.

A method of installing a drop-in cooking device in a fixture having an opening is further provided, including the steps of positioning the cooking device in the opening in the fixture, placing a cover of the cooking device into a working configuration, in which the cover has a first height, wherein the cover comprises a thermally insulating material and has a collapsible portion, and placing the cover into a storage configuration, in which the cover has a second height, by exerting a downward force on the collapsible portion of the cover, wherein the second height is less than the first height.

In some embodiments, the step of placing the cover into the storage configuration includes exerting the downward force on a top surface of the cover. In additional embodiments, the step placing the cover into the storage configuration includes exerting the downward force on at least two side edges of the collapsible portion.

Other objects of the invention and its particular features and advantages will become more apparent from consideration of the following drawings and accompanying detailed description.

DETAILED DESCRIPTION OF THE INVENTION

Figure 1:
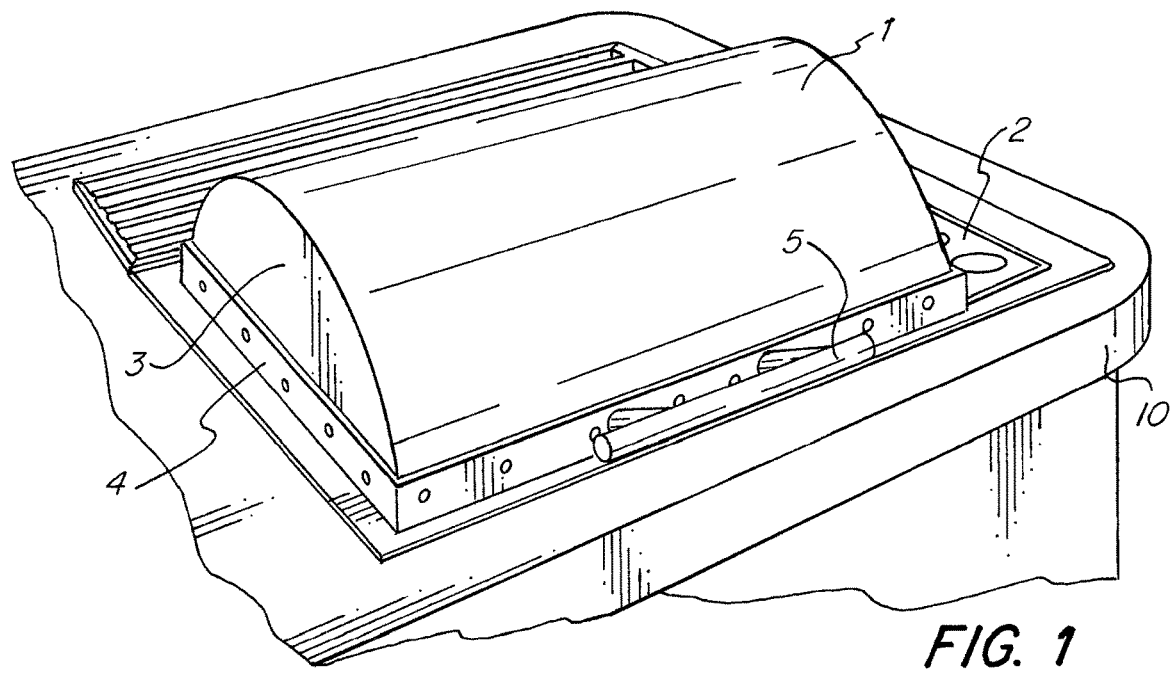
FIG. 1 is top perspective view of a collapsible cover of the present invention, shown in a closed position.
Figure 2:
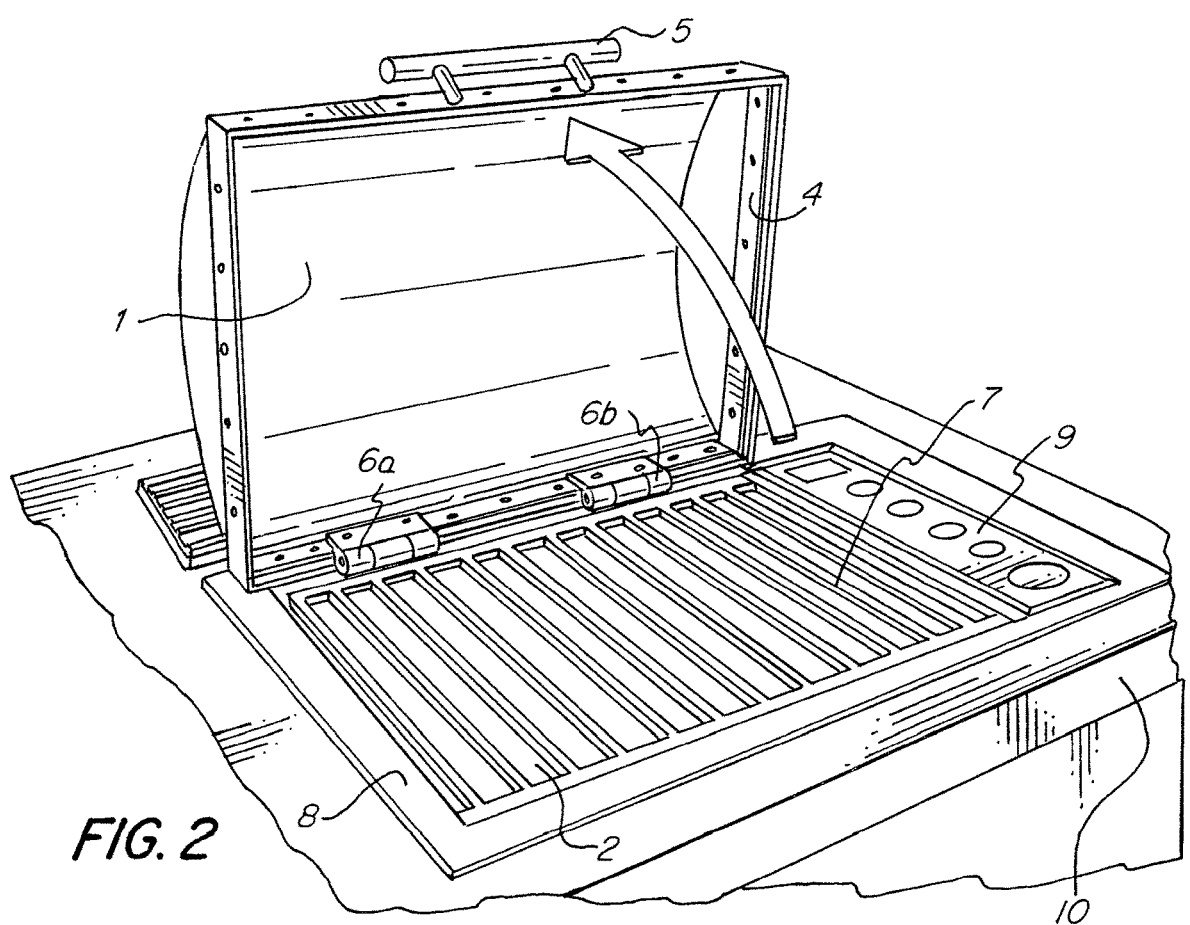
FIG. 2 is top perspective view of the collapsible cover of FIG. 1, shown in an opened position.
Figure 3:
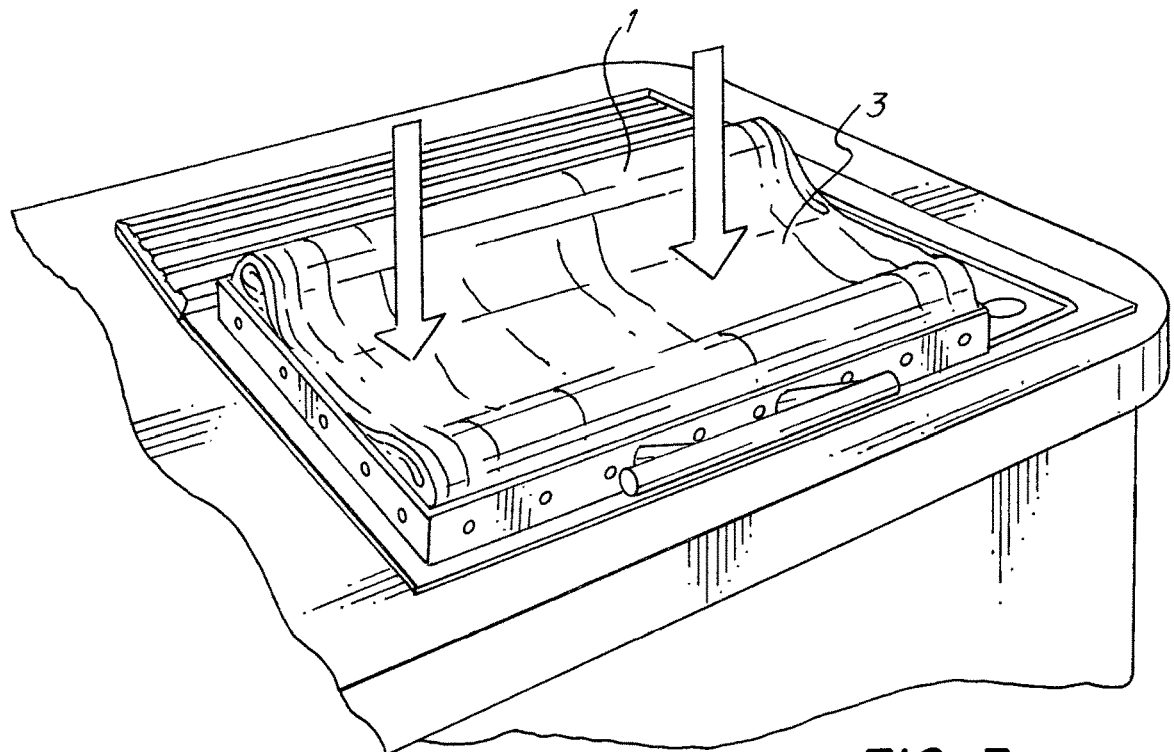
FIG. 3 is a top perspective view of the collapsible cover of FIG. 1, shown in a collapsed position.
Figure 4:
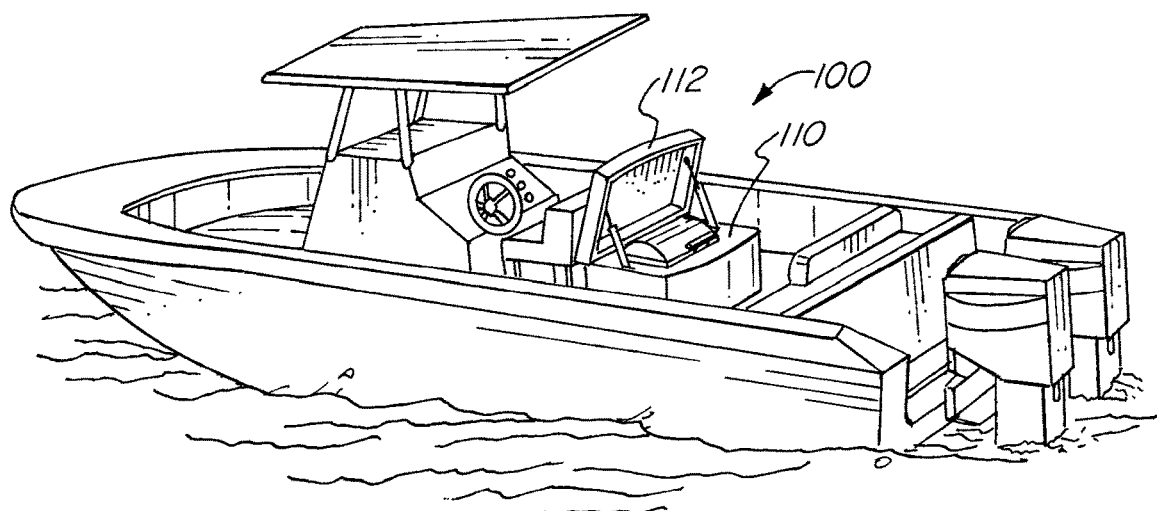
FIG. 4 is a perspective view of a boat with a boat kitchen, wherein the boat kitchen has a grill with a collapsible cover installed therein.
Figure 5:
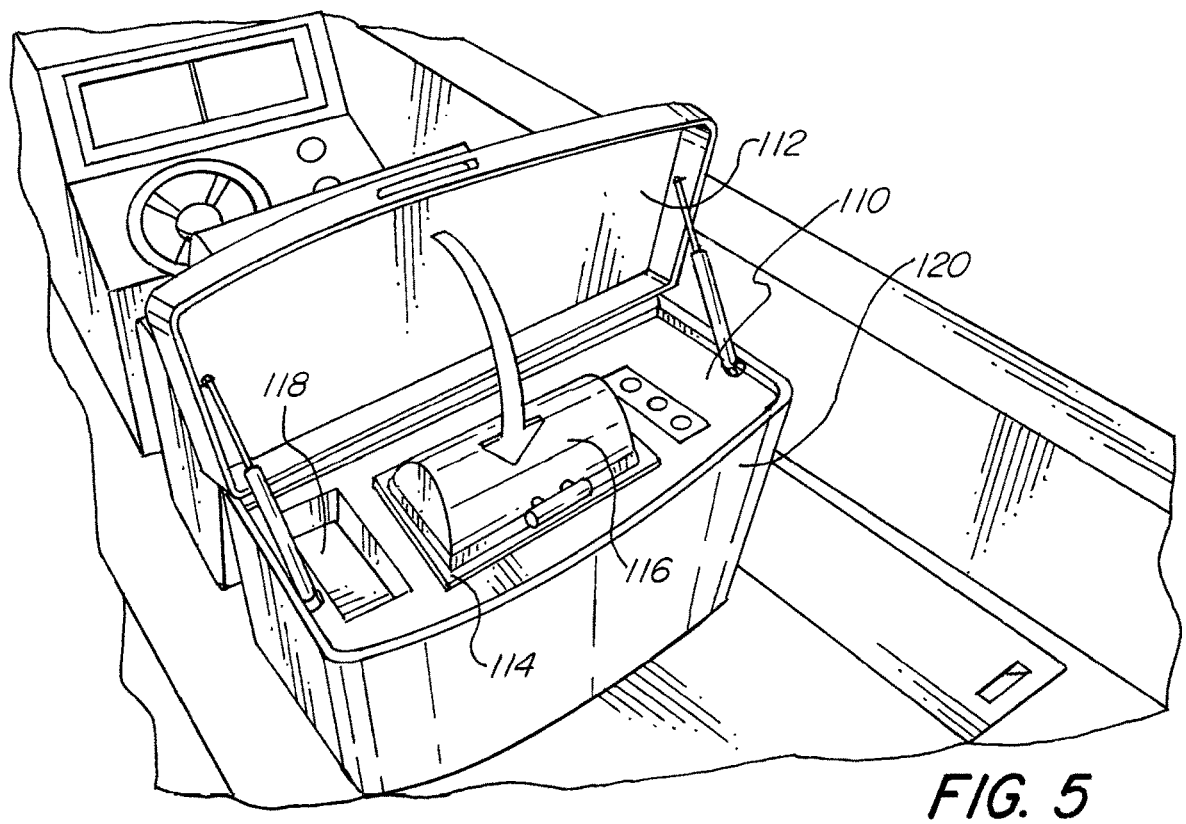
FIG. 5 is an enlarged perspective view of the boat kitchen of FIG. 4, shown with a hard enclosure opened.
Figure 6:
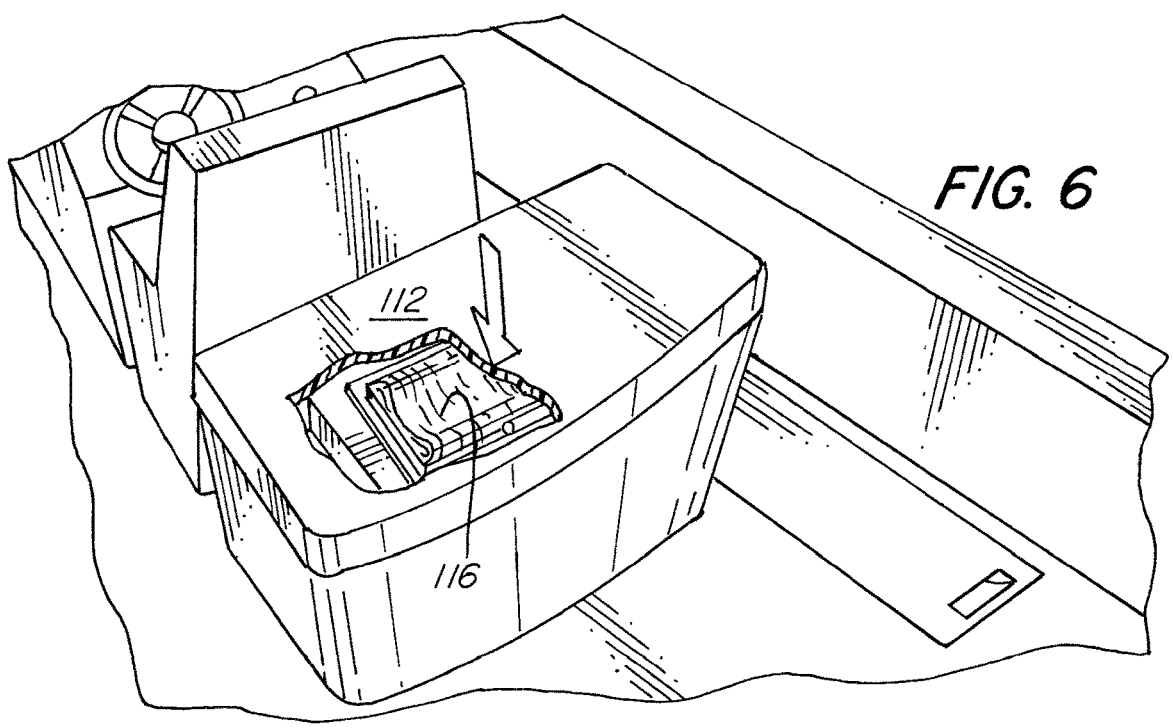
FIG. 6 is an enlarged partially cross-sectional view of the boat kitchen of FIG. 4, shown with a hard enclosure closed.
Figure 7:
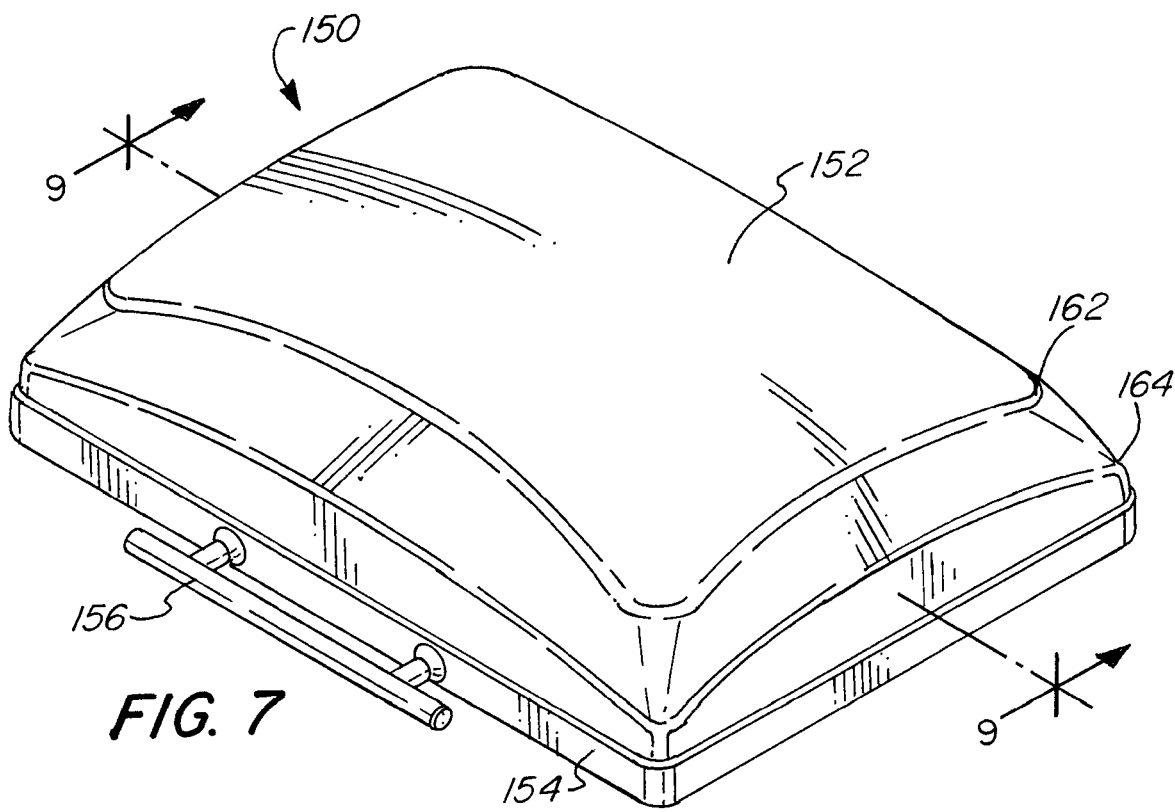
FIG. 7 is a top perspective view of a collapsible cover of the present invention.
Figure 15:
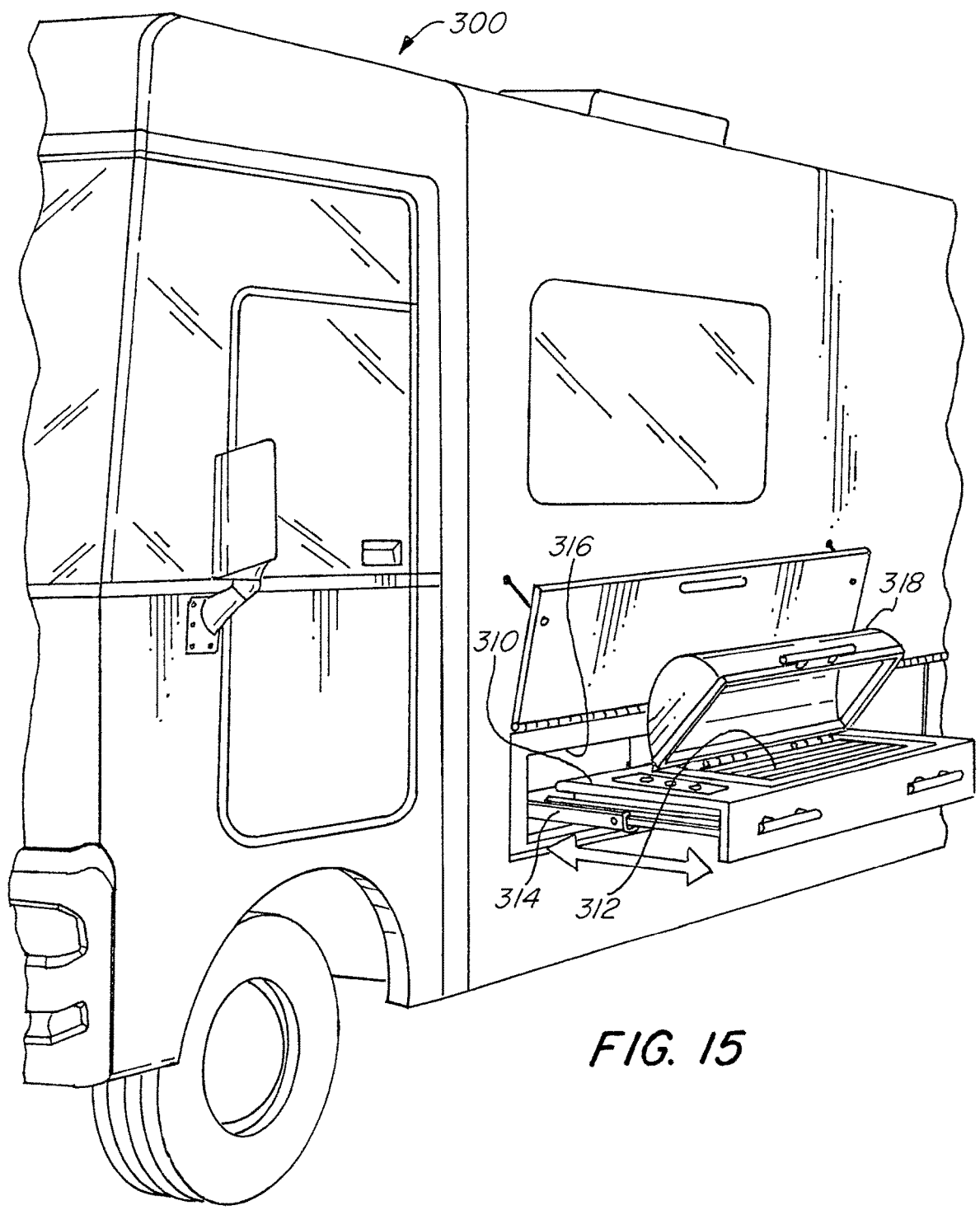
FIG. 15 is a perspective view of a recreational vehicle with a mobile kitchen, wherein the mobile kitchen has a grill with a collapsible cover installed therein.
Figure 16:
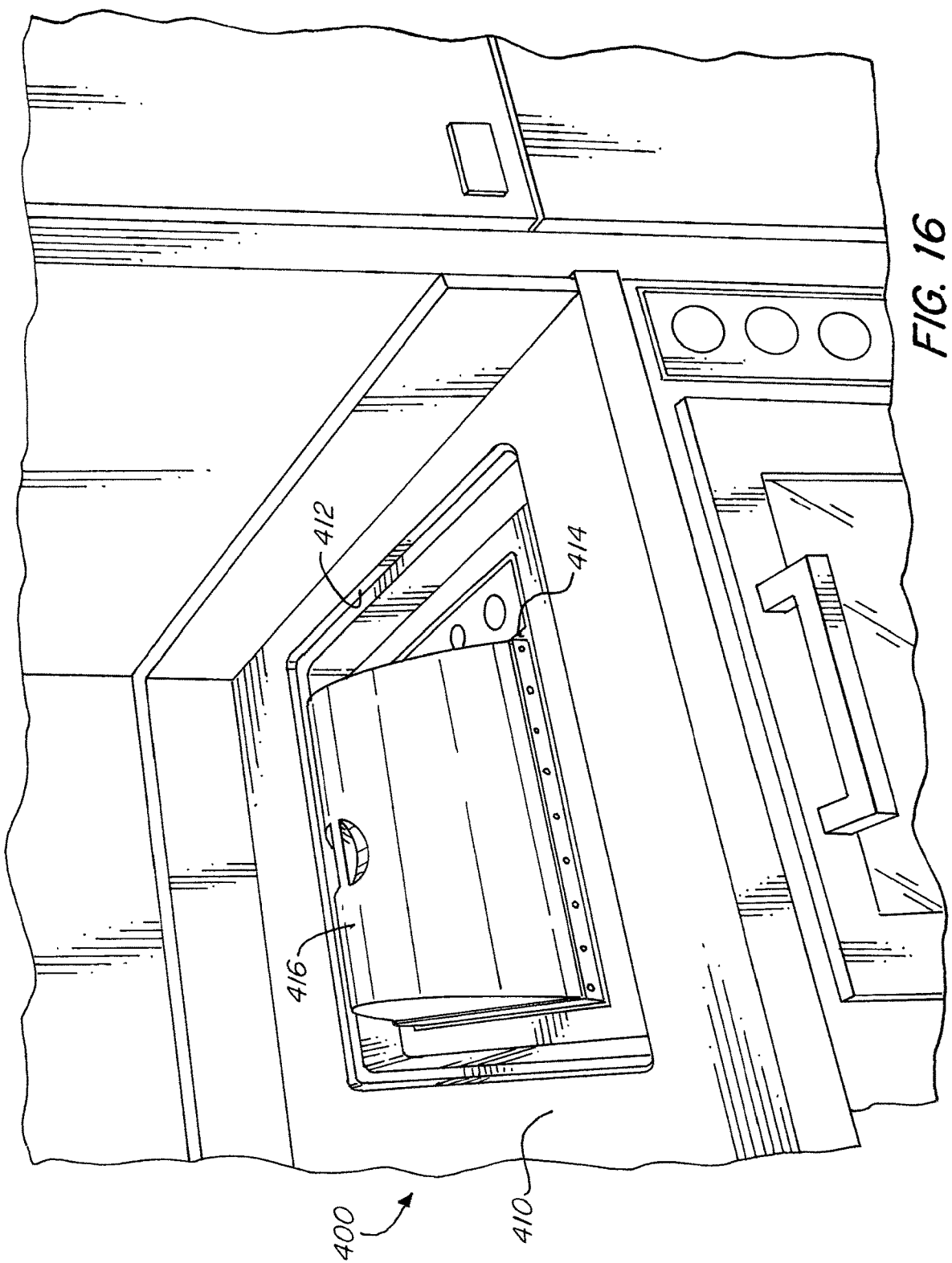
FIG. 16 is a perspective view of a recreational vehicle with a mobile kitchen, wherein the mobile kitchen has a grill with a collapsible cover installed therein.

FIGS. 1-3 show a first embodiment of the collapsible cover of the present invention. The cover 1 is installed in a kitchen and covers a grill 2, as shown in FIG. 2. It is understood that the collapsible 1 may be used in a variety of installations, including on a boat as shown in FIGS. 4-6 and on a recreational vehicle (RV) as shown in FIGS. 15-16, as discussed further below. The cover 1 includes a collapsible portion 3. In the exemplary embodiment shown in FIG. 1, the collapsible portion 3 has a generally cylindrical shape. However, it is understood that the cover can have any other suitable shapes, for example as shown in FIGS. 7-13 and discussed in more detail below, based on the overall look desired for the appliance and/or the desired performance of the cover.

The entire cover and/or the collapsible portion of the cover are made with any suitable thermally insulating material. In one advantageous embodiment, the collapsible portion of the cover is made of a silicone-based rubber, which has the beneficial properties of very high resilience and is stable at relatively high temperatures. It is also an excellent thermal insulator. Covers formed of silicone rubber tend to retain the heat of the cooking appliance much more efficiently than traditional metal lids.

In a particularly advantageous embodiment, the collapsible portion 3 is made of a silicone rubber that permits users to see objects and food underneath the cover on the cooking appliance. Such a silicone rubber is typically highly translucent or transparent.

In the embodiment shown in FIGS. 1-3, the collapsible portion 3 is attached to a frame 4 with a handle 5. The frame is constructed out of any suitable rigid material, such as, for example, stainless steel. The collapsible portion 3 can be attached to the frame 4 in a number of ways. These include the use of adhesives or fastening devices like screws and designing the collapsible portion to make a press-fit connection with a part of the frame. In some embodiments, the collapsible portion is molded over the frame. It is noted that in other embodiments described below, the cover does not have a frame, but rather is entirely constructed from a thermally insulating flexible material.

FIG. 2 shows the cover 1 in an open position, as it has been pivoted on its hinges 6a and 6b. The hinges 6a and 6b are positioned on the frame 4 and attached the cover 1 to the grill 2 adjacent a cooking surface 7 of the grill. The cover 1 is sized to cover the cooking surface 7 of the grill 2. It is understood that, in other embodiments, the cover 1 may be attached to the grill 1 via other suitable mechanism. In yet further embodiments, the cover 1 is not attached to the grill 2, but instead is freely removable from the grill 2.

The grill 2 includes a housing that is inserted into an opening in the kitchen fixture 10. The housing has a coupling member for retaining the grill housing in the opening. In the embodiment shown in FIG. 2, the coupling member is a ledge 8 extending adjacent the top surface of the housing along at least two sides of the housing. When the grill housing is dropped into the opening in the fixture, the ledge 8 rests on the edges of the opening thereby retaining the grill in the fixture.

The grill further includes controls 9 positioned on any side of the housing for turning the heating surface on and off and for controlling the temperature of the heating surface. It is understood that the cover of the present invention may be used with any type of a grill, including electric, gas or charcoal grill. Additionally, the cover may be used with induction heat grills, which are heated by induction current. Examples of induction grills are described, for example, in US 2012/0132645 to Oh et al. and U.S. Pat. No. 8,695,488 to Liu, the disclosure of which is incorporated herein in its entirety. Further, the cover is also suitable for use with other cooking devices, such as cooktops, hotplates, etc.

FIG. 3 shows the cover 1 in a collapsed state, wherein the collapsible portion 3 has been collapsed or folded into the frame 4. The cover 1 will enter the collapsed state when a downward force is applied to its top region. In some embodiments, the collapsible portion 3 is arranged such that a uniform downward force applied across the cover's topmost surface will cause a smooth collapse into the frame. In other embodiments, the collapsible portion 3 is arranged so that downward pressure on the side edges of the collapsible portion will cause a smooth collapse into the frame.

In the collapsed configuration shown in this figure, the height of the cover 1 is roughly one quarter of the height when it is not collapsed. The collapsed height varies depending on the specific embodiment and use for particular applications, and includes any reduction in height from the uncollapsed height.

In some embodiments, a cooking appliance, such as a drop-in grill, is supplied with a low-profile enclosure and a collapsible cover that folds underneath the enclosure. Such an embodiment has the advantage of providing an attractive appliance as well as the improved functionality of a highly thermally insulating lid. In such an arrangement, the insulating cover is attached to the appliance in a manner similar to that shown in FIGS. 1-3. The appliance also includes an enclosure for completely covering the kitchen installation. When the user wishes to cook, he or she opens the enclosure, which exposes the appliance that includes a cover according to the present invention. The user cooks with the convenience of the cover and, when finished, can simply close the enclosure, which causes the cover to collapse underneath it. In this way, the user does not have to worry about removing and storing the cover to the appliance separately from the kitchen.

FIGS. 4-6 illustrate a boat kitchen with a drop-in grill installed therein. The boat 100 has the boat kitchen 110 placed on the deck outside the cabin, typically behind the captain and passenger seats. As shown in FIG. 5, the boat kitchen 110 includes a base portion 120 that has one or more openings that house various components of the kitchen. Such components include a grill 114, a sink 118, and other necessary devices.

The boat kitchen 110 further includes a large hard enclosure 112 for covering and protecting various components of the kitchen. The enclosure is connected to the base portion 120 by any suitable mechanism that allows the enclosure 112 to be opened and closed easily. While the boat is under way, the enclosure 112 is closed, but, while the boat is at anchor, the enclosure can be opened to permit use of the kitchen 110.

The enclosure 112 is usually designed so that the kitchen has a low profile. The collapsible cover 116 of the present invention can be permanently secured adjacent the grill 114 even though the enclosure 112 provides a low-profile while the kitchen is covered. As shown in FIG. 6, the collapsible cover 116 will collapse automatically when the enclosure 112 is closed as a result of the force of the closing of the enclosure. When in collapsed configuration, the height the cover 116 is less than the height of the enclosure such that the cover 116 fits easily under the enclosure 112. As a result, the cover may be advantageously attached to the grill, obviating the need to use a detached grill cover that needs to be stowed elsewhere on the boat when the enclosure is closed. This prevents the possibility that the cover will get lost, dislodged during use, or damaged.

FIGS. 7-11 show another exemplary embodiment of the collapsible cover of the present invention. The cover 150 has a rectangular shape with a curved upper portion. The cover 150 comprises a molded silicone collapsible portion 152, a frame 154, a handle 156, and two hinges 158a and 158b. The frame 154 is overmolded inside a part of the collapsible portion 152 and is visible in the cross section view of FIG. 9. The handle 156 in this embodiment is screwed or bolted to the frame 154 after the frame has been molded into the collapsible portion 152. In other embodiments, the handle is molded along with the collapsible portion 152.

The collapsible portion 152 has weakened portions that assist it in folding into its collapsed state. Such weakened portions comprise specifically selected areas of thinner material. The locations of the weakened portions are selected to encourage the forming of folds in the collapsible portion 152 during collapse. The thinness of the material in the weakened portions facilitates these folds. The use of the weakened portions ensures that the collapsible portion 152 of the cover 150 will collapse in the same way and to the same depth consistently each time it is collapsed.

Figure 11:
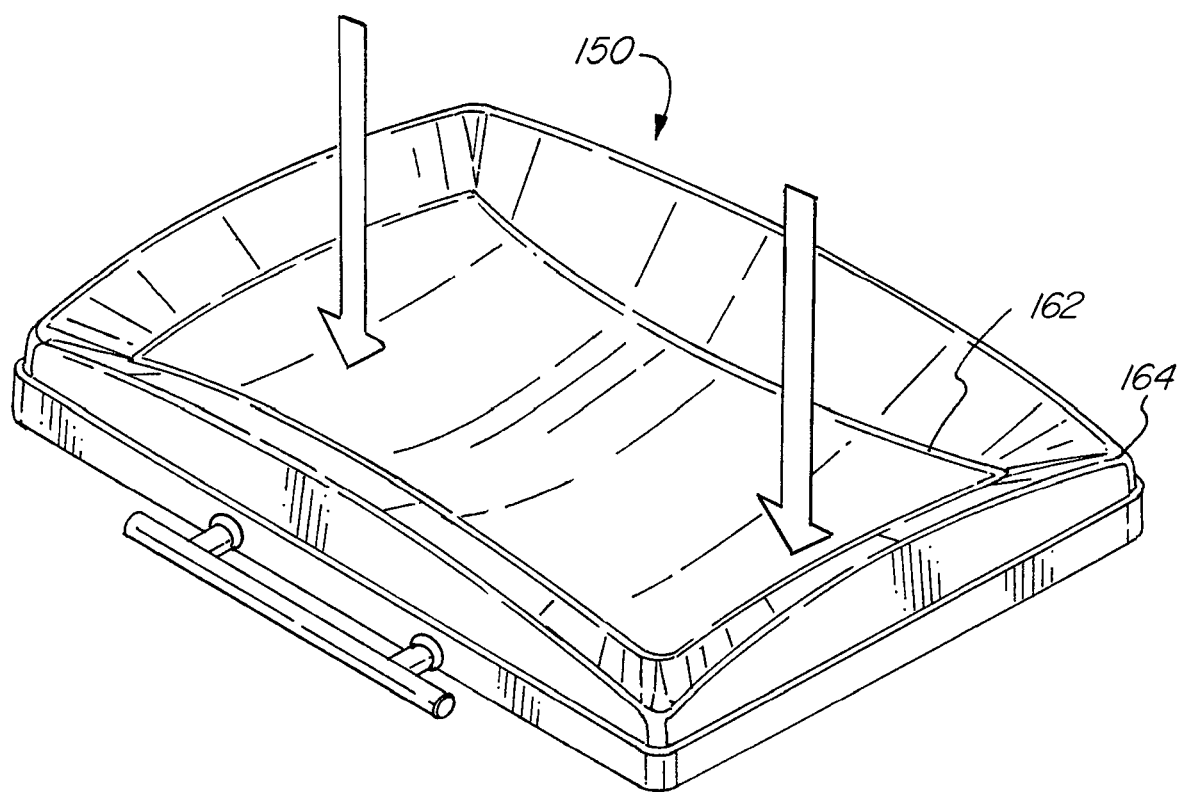
FIG. 11 is a top perspective view of a collapsible cover of FIG. 7, shown in a collapsed configuration.

In the embodiment shown in FIGS. 7-11, the weakened portions are in a form of grooves 162, 164 formed in the underside of the collapsible portion 152. The grooves run around the periphery of the top and sides of the collapsible portion and are formed by a thinner material than the rest of the collapsible portion 152. The grooves formed to encourage the formation of folds at those positions in the collapsible portion 152 when downward force is applied to collapse the cover, as shown in FIG. 11. The grooves 162, 164 shown in this embodiment is generally rectangular, but with curved sides. In other embodiments, additional grooves are included to encourage additional folding points. In still other embodiments, the grooves are given a different shape to correspond to a differently shaped cover.

Figure 8:
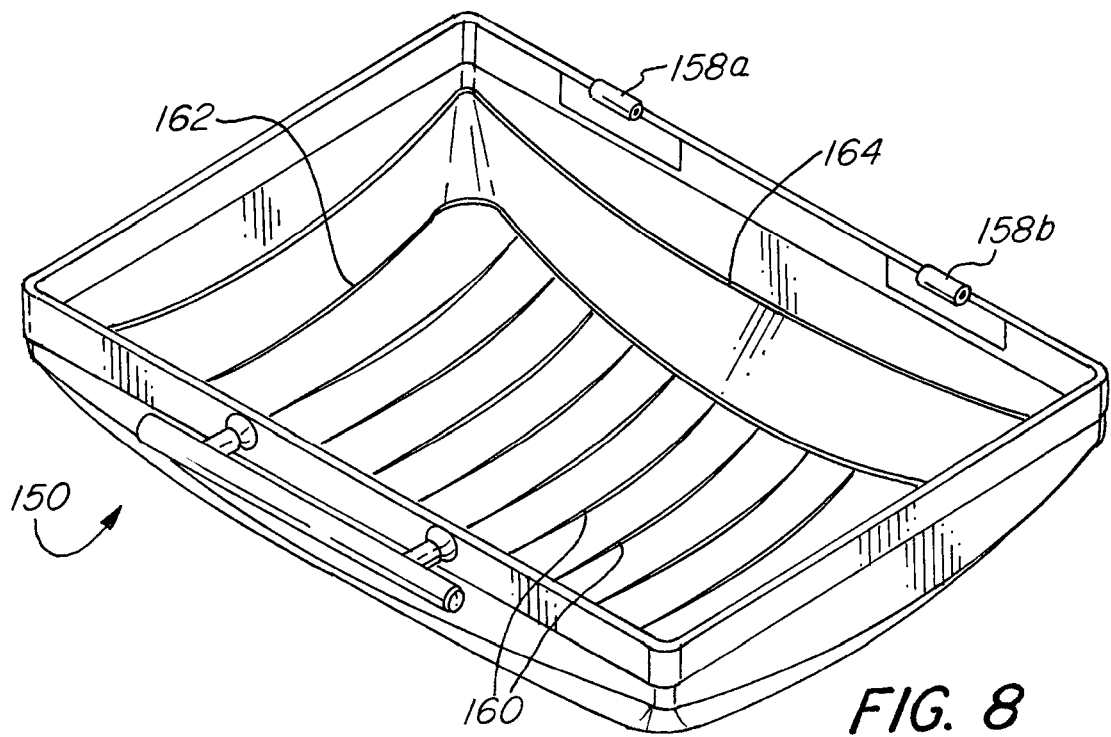
FIG. 8 is a bottom perspective view of the collapsible cover of FIG. 7.
Figure 9:
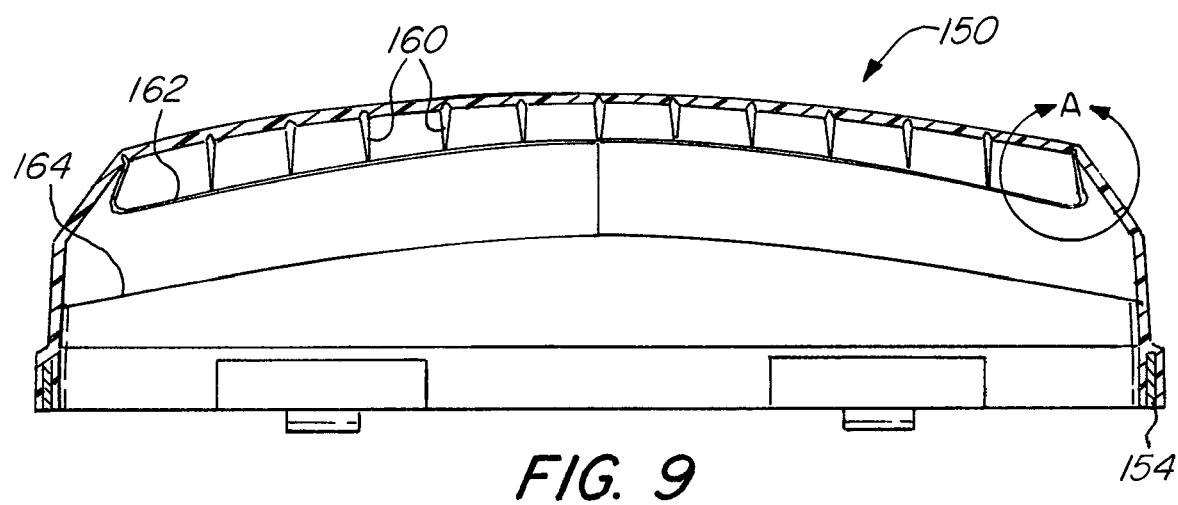
FIG. 9 is a cross-sectional view of the collapsible cover of FIG. 7, taken along the line "9-9".
Figure 10:
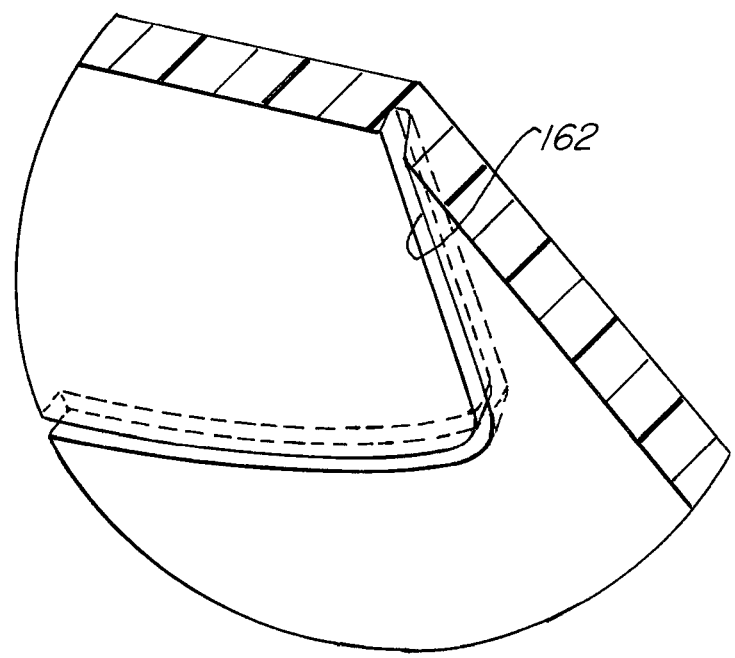
FIG. 10 is a partial enlarged view of the area labeled as "A" in FIG. 9.

As seen in FIG. 8, the cover 150 also includes ribs 160 positioned on the underside of the top of the collapsible portion 152. The ribs 160 in this embodiment are integral with and formed of the same material and during the same molding process as the collapsible portion 152 of cover 150. In other embodiments, ribs are attached separately from the molding of the collapsible portion. The ribs function to increase the structural strength of the collapsible portion and lessen or eliminate any sagging of the top of the cover, since the collapsible portion in this embodiment is formed of a flexible material. The ribs extend substantially parallel to the shorter sides of the cover, as shown in this figure, or may extend substantially parallel to the longer sides of the cover.

Figure 12:
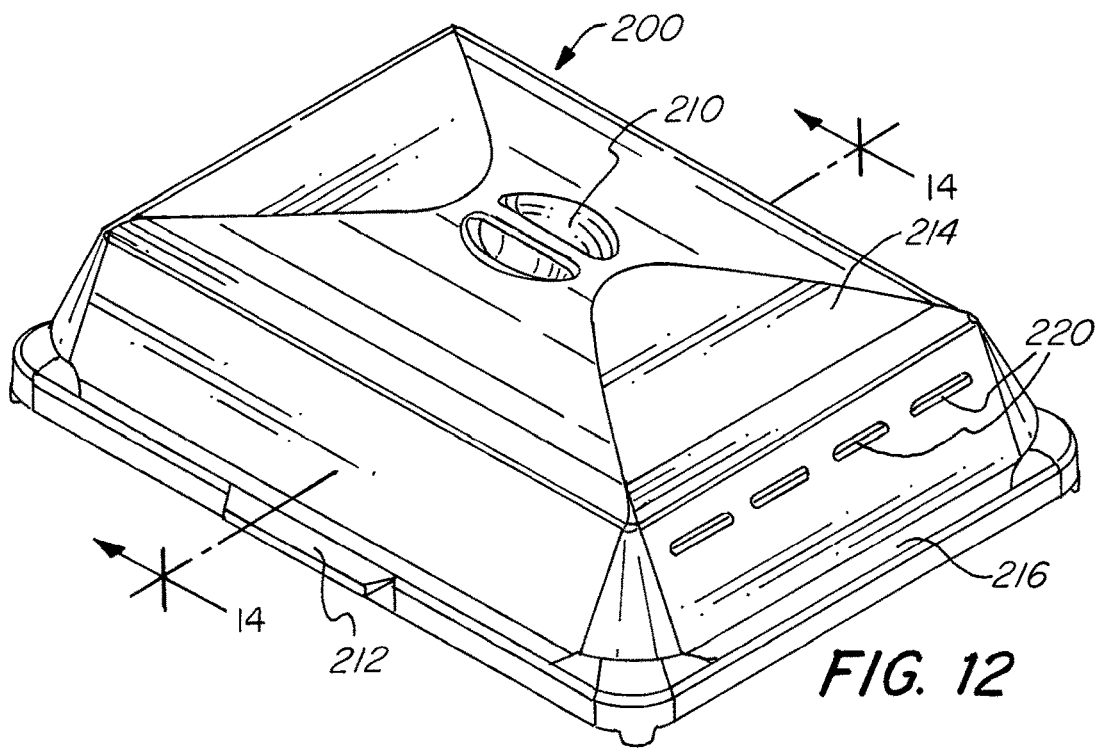
FIG. 12 is a top perspective view of a collapsible cover of the present invention.
Figure 13:
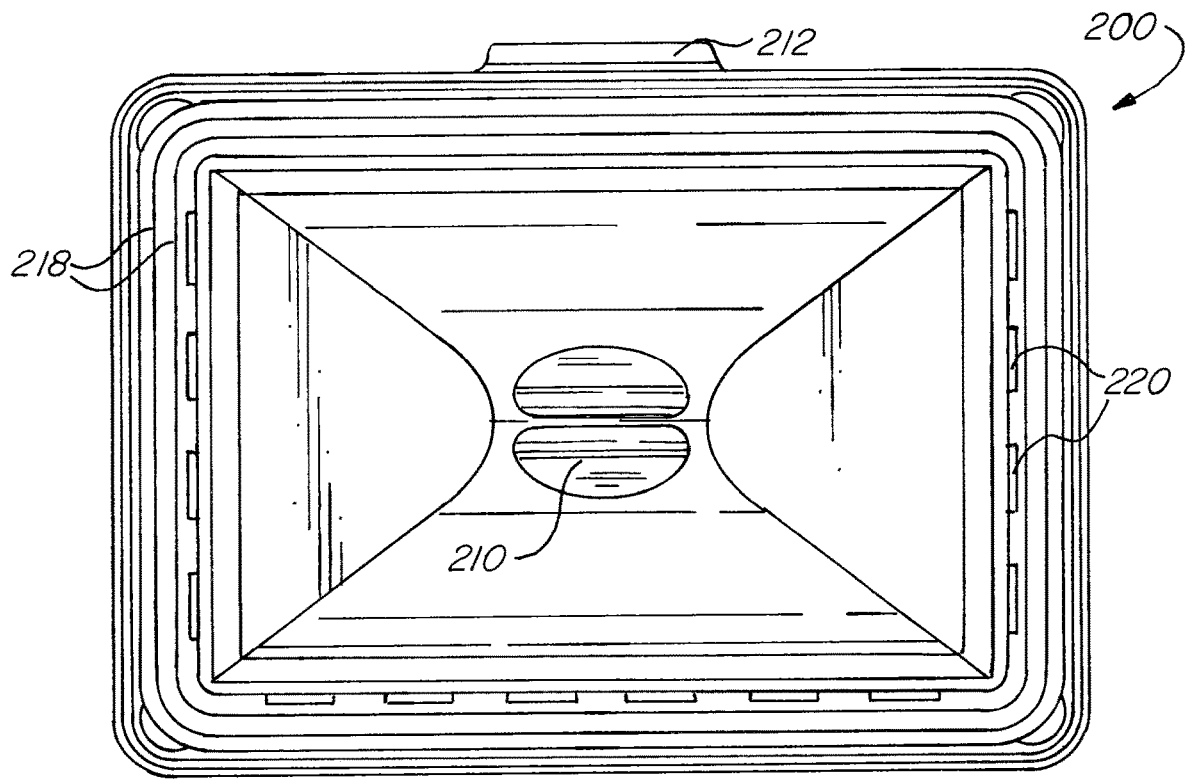
FIG. 13 is a bottom plan view of the collapsible cover of FIG. 12.
Figure 14:
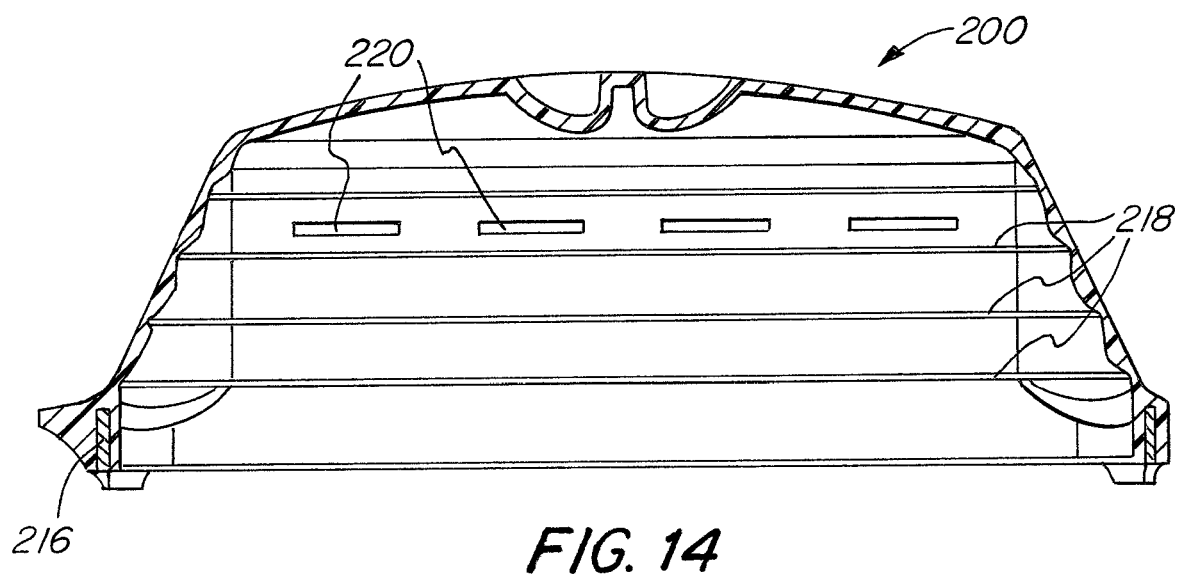
FIG. 14 is a cross-sectional view of the collapsible cover of FIG. 12, taken along the line "14-14".

FIGS. 12-14 show an additional exemplary embodiment of the collapsible cover of the present invention. In this embodiment, the cover 200 does not have hinges for permanent attachment to the grill or another cooking device. Instead, the cover 200 is a separate structure and has a gripping member 210 positioned on the top surface of the cover 200. The gripping member 210 facilitates the gripping of the cover by a user such that it can be placed on the grill or lifted off the grill as desired.

The cover 200 has a generally rectangular shape with slightly curved edges. The cover includes a molded silicone collapsible portion 214, a frame 216, and another handle 212 positioned on the front bottom portion of the cover. It is understood that any other suitable thermally insulating material may be used for the collapsible portion 214. The second handle 212 is used to tilt the cover 200 to partially open it such that food items can be observed inside without having to remove the cover entirely. As shown in FIG. 14, the frame 216 is overmolded inside a part of the collapsible portion 214. The handle 212 in this embodiment is molded along with the collapsible portion 214.

While the exemplary embodiment shown in FIGS. 12-14 does not have hinges for attachment to the cooking device, it is understood that the cover 200 may be provided with hinges or another suitable mechanism for permanently attaching the cover to the cooking device, if desired. It is further noted that the cover 200 may not include the frame 216; instead, the cover 200 may have more rigid material forming the base of the cover and more flexible material forming the collapsible portion.

The collapsible portion 214 of the cover 200 includes a plurality of weakened portions 218, as illustrated in the underside view of the cover in FIG. 13 and the cross-section view in FIG. 14. The weakened portions extend around the periphery of the collapsible portion 214 and run substantially parallel to each other. The weakened portions encourage the formation of folds at those positions in the collapsible portion 214 when downward force is applied to collapse the cover.

In this embodiment, the cover 200 further includes a plurality of slits 220 formed in the walls of the collapsible portion 214. In the embodiment shown in FIGS. 12-14, the slits 220 are positioned on the back wall and the two side walls of the cover 200. However, it is understood that other configurations of slits are also possible. The slits 220 also function to assist in the uniform collapsing of the collapsible portion of the cover when the downward force is applied to the cover. Additionally, the slits 220 function as vents for the hot air to escape from under the cover 200 during cooking.

When a downward force is exerted on the cover 200, the collapsible portion 214 of the cover collapses along the weakened portions such that the cover is brought into a collapsed configuration. The height of the cover, when in the collapsed configuration, is less than the height of the cover in a working configuration. If the cover 200 is used in a setting wherein there is a hard enclosure covering a cooking device, such as, for example in a boat kitchen, as described above, the height of the cover 200 in the collapsed state is such that it fits under the enclosure when the enclosed is in a closed position.

FIGS. 15-16 illustrate two exemplary embodiments of a recreational vehicle (RV) kitchen with a drop-in grill installed therein. As shown in FIG. 15, the RV 300 has a pull-out drawer 310 positioned on a side of the RV. The pull-out drawer includes any suitable mechanism, such as sliding tracks 314, that allows the drawer to be pulled out of the RV for use of the grill and then be pushed back for storage when not in use.

The pull-out drawer 310 has an opening that houses a drop-in cooking device 312. In the embodiment shown in this figure, the cooking device is a drop-in grill. However, it is understood that any other cooking device may be used in accordance with the invention. In addition, the pull-out drawer may include other components of a mobile kitchen, such as, for example, a sink, a cutting board, etc.

The grill 312 includes a collapsible cover 318 positioned over the heating element of the grill. In the embodiment shown, the collapsible cover 318 is hingedly attached to the grill adjacent the heating surface of the grill. In other embodiments, the collapsible cover is not attached to the grill, but is a separate element that is placed over the grill. The collapsible cover 318 has any of the structures discussed above.

The cover is capable of being stored inside the pull-out drawer 310 when the drawer is closed because the height of the cover in its collapsed configuration is such that it fits inside the closed drawer. When in use, the drawer 310 is pulled out from the RV wall and the collapsible cover 318 is placed in its working fully expanded configuration. This may be done automatically when the drawer is opened, for example is the collapsible portion of the cover is made with resilient material that will spring from its collapsed configuration to the expanded configuration once the drawer is opened. Alternatively, a user may manually place the cover in its extended configuration once the drawer is pulled out. The cover is then used to cover the heating surface of the grill during cooking.

After cooking is finished and the grill is turned off, the cover 318 is collapsed by exerting a downward force on it. This is done by manually pressing the top of the cover until it is collapsed. In other embodiments, the cover 318 is collapsed automatically when the drawer 310 is pushed back into the RV wall by exerting a downward force on the top surface of the cover via the top wall of the enclosure into which the drawer is pushed.

Although not shown in this figure, the pull-out drawer may include a hard enclosure that covers the grill for safety and aesthetic appeal when not in use. If the drawer has a hard enclosure, the collapsible cover 318 may be brought to its collapsed storage configuration by simply closing the hard enclosure over the grill, thereby exerting a downward force on the top of the cover. In this embodiment, the height of the cover 318 when in collapsed configuration is such that it fits under the enclosure when the enclosure is in a closed position.

FIG. 16 illustrates another embodiment of a mobile kitchen positioned inside a recreational vehicle. The mobile kitchen 400 is designed similarly to a regular house kitchen—it has a countertop surface 410 with various cooking devices, such as a grill 414, a sink, etc., positioned thereon. As shown in this figure, the grill 414 is placed in an opening in the countertop 410 such that the top cooking surface of the grill is below the top surface of the countertop. When the grill is not in use, a separate countertop piece is placed over the grill such that its top surface is flush with the rest of the countertop surface. This gives the mobile kitchen a more aesthetically pleasing look.

The grill includes a collapsible cover 416. The cover may be of any configuration described above. In the embodiment shown in FIG. 16, the collapsible cover 416 is not attached to the grill; instead, it may be placed over the grill during cooking and then removed completely when the grill is no longer in use. When not in use, the cover 416 is collapsed, as described above, and can then be easily stored in one of the drawers of the mobile kitchen.

In additional embodiments, the cover 416 may be attached to the grill. After the use of the grill, the cover 416 may be brought to its collapsed configuration by placing the countertop piece over it to exert a downward force on the top of the cover. In these embodiments, the height of the cover 416 when in collapsed configuration is such that it fits under the countertop piece once it is placed over the grill.

In some embodiments, the collapsible cover of the present invention can be retrofit onto a cooking appliance that originally included a traditional rigid cover. This arrangement permits the user to choose between a traditional cover and the collapsible cover of the present invention.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A drop-in cooking device for installation into an opening in a fixture, comprising:
   a housing configured to be mounted in the opening in the fixture;
   a heating element positioned in said housing and having a heating surface; and
   a cover attachable to said housing adjacent said heating surface, said cover having four substantially linear bottom edges for contacting said heating surface, comprising a thermally insulating material and having a collapsible portion with a top surface and four sidewalls extending downward from the top surface;
   wherein the collapsible portion of the cover has a working configuration in which said cover has a first height and a storage configuration in which said cover has a second height, the second height being less than the first height; and wherein at least two of the sidewalls comprise three weakened portions extending substantially parallel each other along the sidewalls.

2. The cooking device of claim 1, wherein said cover further comprises a handle for opening and closing of said cover by a user.

3. The cooking device of claim 1, wherein said cover is hingedly attached to said housing.

4. The cooking device of claim 1, wherein the collapsible portion of said cover comprises silicone rubber.

5. The cooking device of claim 1, wherein at least one of said three weakened portions comprises a slit formed in a wall of said collapsible portion.

6. The cooking device of claim 1, wherein at least one of said three weakened portions comprises an area of a wall of said collapsible portion having lesser thickness than the rest of the wall.

7. The cooking device of claim 1, wherein the collapsible portion of said cover comprises a plurality of ribs positioned on an underside of the collapsible portion, wherein said plurality of ribs provide structural support for said cover when the collapsible portion is in the working configuration.

8. The cooking device of claim 1, wherein said cover further comprises a rigid frame secured to an outer periphery of the cover.

9. The cooking device of claim 1, wherein at least a portion of said cover comprises substantially transparent material.

10. The cooking device of claim 1, wherein the drop-in cooking device is a grill.

11. The cooking device of claim 1, wherein the second height of said cover comprises about one-quarter of the first height of said cover.

12. The cooking device of claim 1, further comprising a coupling member for retaining said housing in the fixture.

13. The cooking device of claim 12, wherein said coupling member comprises a ledge extending adjacent a top surface of said housing along at least two sides of said housing.

14. The cooking device of claim 1, wherein said housing is non-collapsible.

15. A method of installing a drop-in cooking device in a kitchen fixture having an opening, comprising the steps of:
positioning the cooking device in the opening in the kitchen fixture;
placing a cover of the cooking device into a working configuration, in which the cover has a first height, wherein the cover comprises a thermally insulating material and has a collapsible portion comprising a top surface and four sidewalls extending downward from the top surface, wherein at least two of the sidewalls comprise three weakened portions extending substantially parallel each other along the sidewalls; and
placing the cover into a storage configuration, in which the cover has a second height, by exerting a downward force on the top surface of the collapsible portion of the cover;
wherein the second height is less than the first height.

16. The method of claim 15, wherein the step of placing the cover into the storage configuration comprises exerting the downward force on a top surface of the cover.

* * * * *